(12) United States Patent
Sasagawa et al.

(10) Patent No.: US 6,771,645 B1
(45) Date of Patent: Aug. 3, 2004

(54) PACKET RELAYING APPARATUS

(75) Inventors: Yasushi Sasagawa, Kanagawa (JP); Kazunori Umezaki, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/578,275

(22) Filed: May 25, 2000

(30) Foreign Application Priority Data

May 28, 1999 (JP) ............................................ 11-150634

(51) Int. Cl.⁷ ............................................ H04L 12/56
(52) U.S. Cl. ..................... 370/392; 370/401; 370/395.1
(58) Field of Search ................................ 370/389, 401, 370/400, 392, 395.1

(56) References Cited

U.S. PATENT DOCUMENTS 6,160,651 A  * 12/2000 Chang et al. ............... 359/124
6,341,127 B1 *  1/2002 Katsube et al. ............. 370/252
6,499,061 B1 * 12/2002 Benayoun et al. .......... 709/245

* cited by examiner

*Primary Examiner*—Chau Nguyen
*Assistant Examiner*—Andrew Wahba
(74) *Attorney, Agent, or Firm*—Katten Muchin Zavis Rosenman

(57) ABSTRACT

In a packet relaying apparatus, a label distribution protocol processor performs a label assignment so that labels which a label management portion of its own processor manages and which the label management portion of an adjoining packet relaying apparatus manages are assigned in mutually reversed orders within a label available range when a directionality is determined to be unidirectional. In addition, an incoming label and an outgoing label assigned to a unidirectional FEC can be used as the outgoing label and the incoming label assigned to another FEC opposite in direction to the former FEC.

8 Claims, 13 Drawing Sheets

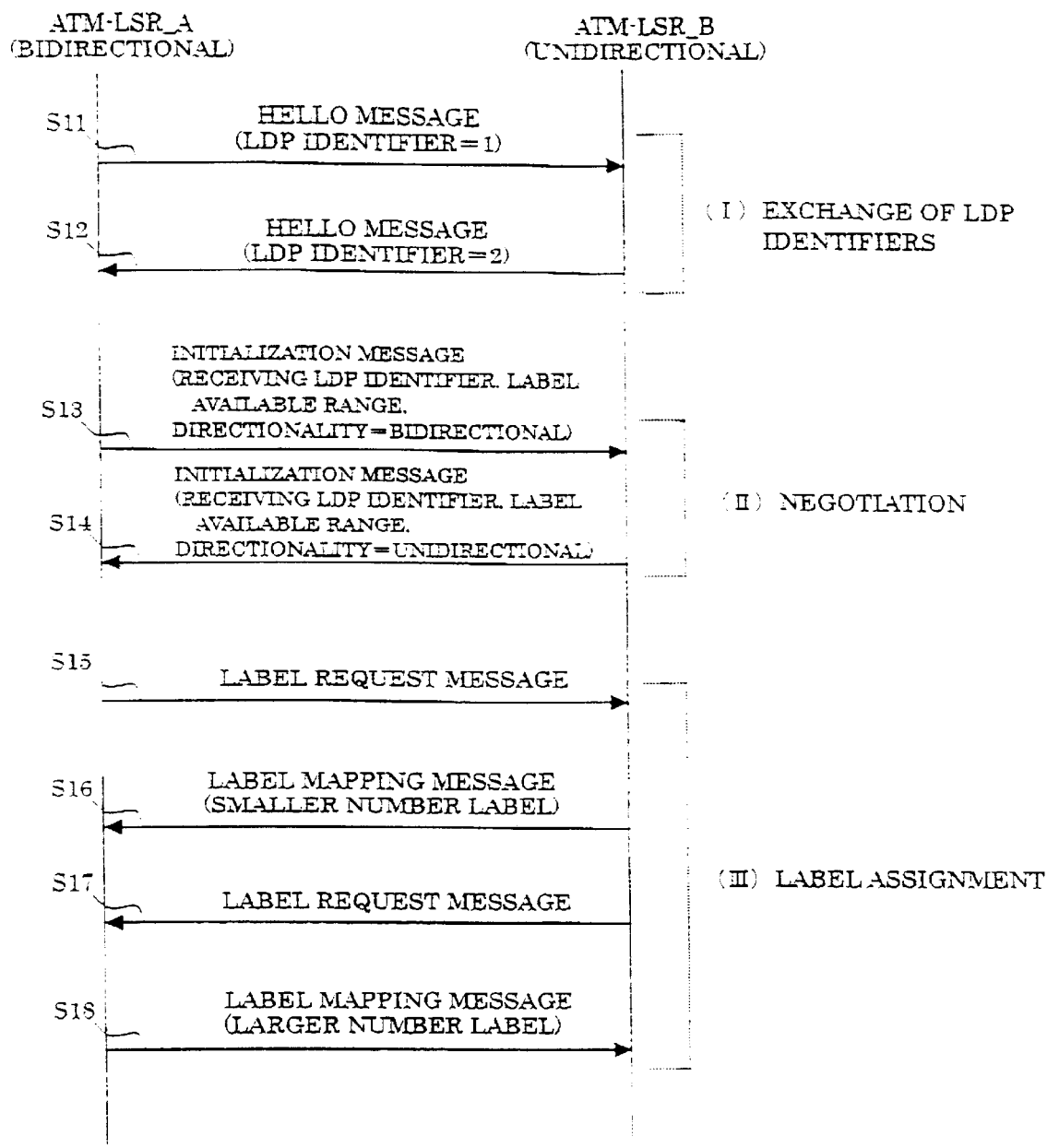

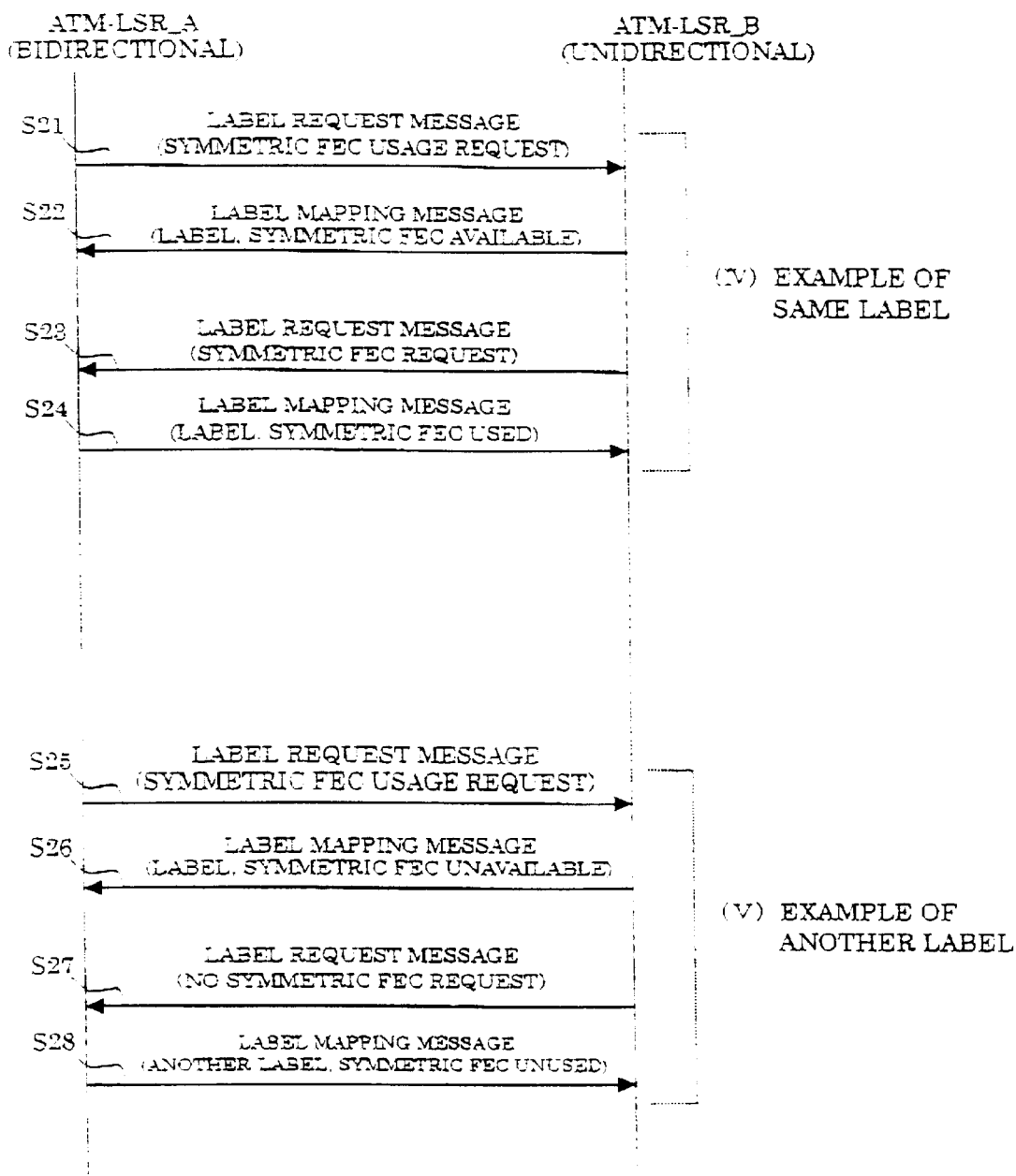

FIG.6A LABEL MAPPING MESSAGE (VENDOR PRIVATE MESSAGE)

```
 0                   1                   2                   3
 0 1 2 3 4 5 6 7 8 9 0 1 2 3 4 5 6 7 8 9 0 1 2 3 4 5 6 7 8 9 0 1
|U| INHERENT LABEL MAPPING (0x2F40) |       MESSAGE LENGTH        |
|                         MESSAGE ID                              |
|                          FEC TLV                                |
|                         LABEL TLV                               |
|                      OPTIONAL PARAMETER                         |
```

FIG.6B LABEL REQUEST MESSAGE (VENDOR PRIVATE MESSAGE)

```
 0                   1                   2                   3
 0 1 2 3 4 5 6 7 8 9 0 1 2 3 4 5 6 7 8 9 0 1 2 3 4 5 6 7 8 9 0 1
|U| INHERENT REQUEST (0x2F41)     |       MESSAGE LENGTH         |
|                         MESSAGE ID                              |
|                          FEC TLV                                |
|                      OPTIONAL PARAMETER                         |
```

FIG.6C SYMMETRIC FEC ASSIGNMENT OPERATION TLV
(VENDOR PRIVATE TLV)

```
 0                   1                   2                   3
 0 1 2 3 4 5 6 7 8 9 0 1 2 3 4 5 6 7 8 9 0 1 2 3 4 5 6 7 8 9 0 1
|U|F|   SYMMETRIC FEC (0x2F15)    |           LENGTH             |
|                          VENDOR ID                              |
|B|V|                                                             |
```

FIG.6D FEC TLVS (VENDOR PRIVATE TLV)

```
 0                   1                   2                   3
 0 1 2 3 4 5 6 7 8 9 0 1 2 3 4 5 6 7 8 9 0 1 2 3 4 5 6 7 8 9 0 1
|U|F|       FEC (0x2F10)          |           LENGTH             |
|                        FEC ELEMENT 1                            |
~                                                                 ~
|                        FEC ELEMENT n                            |
```

FIG.12A HELLO MESSAGE

```
 0                   1                   2                   3
 0 1 2 3 4 5 6 7 8 9 0 1 2 3 4 5 6 7 8 9 0 1 2 3 4 5 6 7 8 9 0 1
|U|     HELLO (0x0100)        |         MESSAGE LENGTH          |
|                          MESSAGE ID                           |
|                  COMMON HELLO PARAMETER TLV                   |
|                       OPTIONAL PARAMETER                      |
```

FIG.12B INITIALIZATION MESSAGE

```
 0                   1                   2                   3
 0 1 2 3 4 5 6 7 8 9 0 1 2 3 4 5 6 7 8 9 0 1 2 3 4 5 6 7 8 9 0 1
|U|   INITIALIZATION (0x0200) |         MESSAGE LENGTH          |
|                          MESSAGE ID                           |
|                  COMMON SESSION PARAMETER TLV                 |
|                       OPTIONAL PARAMETER                      |
```

FIG.12C ATM SESSION PARAMETER

```
 0                   1                   2                   3
 0 1 2 3 4 5 6 7 8 9 0 1 2 3 4 5 6 7 8 9 0 1 2 3 4 5 6 7 8 9 0 1
|U|F| ATM SESSION PARAMETER (0x0501)|         LENGTH            |
| M | N |D|                   RESERVED FIELD                    |
|                   ATM LABEL RANGE COMPONENT 1                 |
|                              ~                                |
|                   ATM LABEL RANGE COMPONENT N                 |
```

PRIOR ART

FIG.13A LABEL MAPPING MESSAGE

```
 0                   1                   2                   3
 0 1 2 3 4 5 6 7 8 9 0 1 2 3 4 5 6 7 8 9 0 1 2 3 4 5 6 7 8 9 0 1
|U|     LABEL MAPPING (0x0400)     |        MESSAGE LENGTH       |
|                              MESSAGE ID                        |
|                               FEC TLV                          |
|                              LABEL TLV                         |
|                          OPTIONAL PARAMETER                    |
```

FIG.13B LABEL REQUEST MESSAGE

```
 0                   1                   2                   3
 0 1 2 3 4 5 6 7 8 9 0 1 2 3 4 5 6 7 8 9 0 1 2 3 4 5 6 7 8 9 0 1
|U|     LABEL REQUEST (0x0401)     |        MESSAGE LENGTH       |
|                              MESSAGE ID                        |
|                               FEC TLV                          |
|                          OPTIONAL PARAMETER                    |
```

PACKET RELAYING APPARATUS

BACKGROUND OF THE INVENTION

1. Field of the Invention

The present invention relates to a packet relaying apparatus, specifically a label switching router (hereinafter occasionally abbreviated as LSR), and in particular to a packet relaying apparatus used for MPLS (Multi-Protocol Label Switching).

The MPLS is a technique being presently standardized by an MPLS working group of the IETF as a basic technique for an Intranet and an Internet backbone.

A label switching technique having characteristics of high-speed data transmission/scalability/easy traffic control is utilized for the MPLS. In the label switching, a routing process at an IP level (layer 3) and a switching process at a lower layer (layer 2) by an ATM switch, a frame relay switch, an Ethernet switch, and the like are united to perform forwarding of the layer 2 by a label assigned to a packet.

In the MPLS, a group of layer 3 packets transferred by the same method or treatment (for example, transferred on the same path and the same service class) is defined as an FEC (forwarding equivalence class), and the same label is assigned to the group of packets corresponding to the FEC.

Hereafter, the forwarding of the layer 2 can be performed to the packets to which the label is assigned by referring only to the label to determine parameters required for the forwarding of the layer 2 such as a transferring path and a service class by the FEC corresponding to the label.

The label switching router as the packet relaying apparatus serves to realize the label switching, so that how the label is assigned to the packets is important.

2. Description of the Related Art

In a connection oriented network such as an ATM or a frame relay, the "connection" can be generally used as a bidirectional connection, i.e. connection in both directions or as a unidirectional connection, i.e. connection in one direction.

Furthermore, a single connection identifier is generally assigned to the bidirectional connection and also the unidirectional connection.

In consideration of setting up paths by two independent connections in a unidirection "a" or "b" in FIG. 9, the same connection identifier such as a VPI/VCI=0/33 in FIG. 9 can be generally used as the connection identifier which identifies "a" and the connection identifier which identifies "b" with respect to the connection between a port 1 in FIG. 9 and an adjoining apparatus. The apparatus which can realize this method is defined as the one having a bidirectional capability with respect to the directionality.

However, when the path is set up by the unidirectional connection such as "a" shown in FIG. 9, many prior art apparatuses set up the path even for "b" which may not be actually set up but only for management and which is not inherently necessary as shown in FIG. 8, in terms of hardware or management restraint. In other words, many apparatuses exist which substitute the path setting by the bidirectional connection for the unidirectional one. This is defined as an apparatus having a unidirectional capability with respect to the directionality.

It is known that an ATM switch which forms an ATM-LSR for realizing the label switching in the ATM network has a unidirectional VC capability or a bidirectional VC capability as a VC (Virtual Connection) directionality.

Also, it is known that a frame relay switch which forms a frame relay LSR (Frame Relay Label Switching Router) for realizing the label switching in the frame relay network has a unidirectional DLCI capability or a bidirectional DLCI capability as a DLCI (Data Link Connection Identifiers) directionality.

It is to be noted that the combination of the VPI and the VCI (VPI/VCI) is generally used for the label used in the label switching between adjoining ATM-LSR's and the DLCI is generally used for the label between adjoining frame relay LSR's.

Hereinafter, the label switching will be more specifically described with the ATM switch which forms the ATM-LSR being taken as an example.

FIG. 8 shows an ATM switch 310 having the unidirectional capability. In case of "unidirectional", normally the connection "b" (incoming VPI/VCI=0/34 at port 2; outgoing VPI/VCI=0/33 at port 1) is automatically set up when the connection "a" (incoming VPI/VCI=0/33 at port 1; outgoing VPI/VCI=0/34 at port 2) is set up.

When the ATM-LSR is formed of the ATM switch 310, the incoming label 0/33 is to be switched over to the outgoing label 0/34 for a packet directed to the connection "a" because the VPI/VCI is used as the label. Being used for the link with an adjoining ATM-LSR connected to the port 1, the incoming label 0/33 for the ATM switch 310 is an outgoing label for the adjoining ATM-LSR. Likewise, the outgoing label 0/34 is an incoming label for the adjoining ATM-LSR connected to the port 2.

In this way, the label switching assigns the label to the link having the directionality to make switching between the incoming label and the outgoing label in each of the LSR's.

Accordingly, in the example of FIG. 8, when a label assignment is firstly directed to the connection "a", the connection "b" opposite in direction can not use the labels 0/33 and 0/34 because they have been already used for the label switching of the connection "a".

FIG. 9 shows an ATM switch 320 having the bidirectional capability. In this case, the connection "a" (incoming VPI/VCI=0/33 at port 1; outgoing VPI/VCI=0/34 at port 2) and the connection "b" (incoming VPI/VCI=0/35 at port 3; outgoing VPI/VCI=0/33 at port 1) can be independently set up.

When the ATM-LSR is formed of the ATM switch 320, the switching between the incoming label 0/33 and the outgoing label 0/34 is to be performed for the packet directed to the connection "a". Also, the switching between the incoming label 0/35 and the outgoing label 0/33 is performed for the packet directed to the connection "b".

Namely, in case of the ATM switch having the bidirectional capability, a single label (0/33) can be used as an independent label for both direction links.

It is to be noted that in the label assignment between the adjoining ATM-LSR's, one ATM-LSR normally sends a label request message to the other ATM-LSR so that a label mapping message returned back from the other ATM-LSR determines an available label. In this respect, the prior art ATM-LSR has adopted such a method that only the label assigned by itself is managed and the label notified from others is used as it is.

When the label is used for "bidirectional", there is no particular problem as to the label assignment because the adjoining ATM-LSR's perform the label assignment (or distribution) independently of each other.

However, when the label is used for "unidirectional", there is a possibility that the label which the same router is about to assign coincides with the label which others are about to assign by the management of only the former label, so that such a label collision is required to be avoided.

Therefore, the LSR has been developed, as shown in FIG. 10, which performs the label assignment by fixedly assigning odd number labels or even number labels. Hereinafter, the operation will be described.

It is supposed that an ATM-LSR_A has the bidirectional capability and an ATM-LSR_B has the unidirectional capability in FIG. 10.

(I) Exchange of LDP Identifiers

The ATM-LSR_A sends a hello message including an LDP identifier (=1) for identifying itself to the adjoining ATM-LSR_B (at step S11). The ATM-LSR_B which has received the identifier returns a hello message including an LDP identifier (=2) for identifying itself to the ATM-LSR_A (at step S12).

It is to be noted that the format of a general LDP message is as shown in FIG. 11, and the message is composed of the fields of a "U" bit, a message type, a message length, a message ID, an essential parameter, and an optional parameter. The message whose type in FIG. 11 is "0x0100" is the hello message shown in FIG. 12A, including the LDP identifier in the field of the optional parameter.

(II) Negotiation

The ATM-LSR_A sends an initialization message including the information of "receiving LDP identifier (=2)", "label available range", and "directionality (=bidirectional)" to the ATM-LSR_B (at step S13), while the ATM-LSR_B similarly returns an initialization message including "receiving LDP identifier (=1)", "label available range", and "directionality (=unidirectional)" to the ATM-LSR_A (at step S14).

The logical multiplication of mutual label available ranges is now obtained at both LSR's to determine the label available ranges. In addition, since the ATM-LSR_B is "unidirectional", the directionality becomes "unidirectional".

The message whose type is "0x0200" in. FIG. 11 is the initialization message, its format being as shown in FIG. 12B. An ATM session parameter shown in FIG. 12C is prescribed in the optional parameter field of FIG. 12B. In FIG. 12C. "D" bit shows a VC directionality, and the label available range (the maximum and the minimum value respectively of VPI and VCI) is prescribed in ATM label range component fields.

(III) Label Assignment

In the LDP identifiers exchanged between both LSR's in the above-mentioned (I), the LDP identifier of the ATM-LSR_A is smaller, than that of the ATM-LSR_B. Therefore, the labels assigned to the -ATM-LSR_A assume even numbers, and those to the ATM-LSR_B assume odd numbers.

Namely, when the ATM-LSR_A uses a label, it sends the label request message to the ATM-LSR_B (at step S15), and is assigned even number labels by the label mapping message sent from the ATM-LSR_B (at step S16).

To the contrary, when the ATM-LSR_B uses a label, it sends the label request message to the ATM-LSR_A (at step S17), and is assigned odd number labels by the label mapping message sent from the ATM-LSR_A (at step S18).

It is to be noted that the message whose type in FIG. 11 is "0x0402" is the label request message, its format being shown in FIG. 13B. In addition the message whose type in FIG. 11 is "0x0401" is the label mapping message, its format being shown in FIG. 13A.

As mentioned above, the prior art LSR fixedly assigns even number labels or odd number labels to the adjoining LSR's when the directionality is "unidirectional". For this reason, when there is an unbalanced occurrence of label requests between the adjoining LSR's, the situation occurs where irrespective of an open label on one side it can not be used on the other side, resulting in a decreased label availability (usage efficiency).

Also, as shown in FIGS. 14A and 14B, when a network N1 on the transmitting side is connected to a network N2 on the receiving side by an MPLS network N3 composed of a plurality of LSR's, following problems arise:

FIG. 14A shows the case where all of the LSR's (LSR10-LSR50) in the MPLS network N3 are "unidirectional". Expressing a forwarding equivalence class showing a packet flow from the network N1 on the transmitting side to the network N2 on the receiving side by an FEC_Af (N1→N2), an LSP (Label Switched Path) which is a path corresponding to the packet flow is set up in the order of LSR10→LSR30→LSR40→LSR50 as an LSP_A1.

At this time, since the LSR10, the LSR30, the LSR40, and the LSR50 are "unidirectional", as mentioned above, an LSP_B1 showing the same path as the LSP_A1 opposite in direction is automatically set up in the order of LSR50→LSR40→LSR30→LSR10. The LSP_B1 corresponds to a forwarding equivalence class FEC-Bf (N2→N1) which shows the packet flow when the network N2 is a transmitter and the network N1 is a receiver. However, due to the characteristic of the prior art unidirectional LSR, the LSP_B1 can not be used.

Also, FIG. 14B shows the case where the unidirectional LSR (LSR10, LSR20, LSR50) and the bidirectional LSR (LSR30 and LSR40) exist together in the MPLS network N3.

In the same way as FIG. 14A supposing that the forwarding equivalence class showing the packet flow from the network N1 which is a transmitter to the network N2 which is a receiver is the FEC-Af (N1→N2), the LSP_A1 which is the LSP corresponding to the FEC-AF is set up in the order of the LSR10→LSR30→LSR40→LSR50.

At this time, since the LSR10 and the LSR50 are "unidirectional", LSR30→LSR10 and LSR50→LSR40, which are parts of the LSP_B1 (LSR50→LSR40→LS30→LSR10) which shows the same path as the LSP_A1 opposite in direction, are automatically set up. In the same way as FIG. 14A, the LSP_B1 corresponds to the forwarding equivalence class FEC_Bf (N2→N1) which shows the packet flow when the network N2 is a transmitter and the network N1 is a receiver. However, the LSR50→LSR40 and the LSR30→LSR10 automatically set up can not be used.

Namely, when the label is assigned to the forwarding equivalence class FEC_Bf (N2→N1), the LSR10, the LSR30, the LSR40, and the LSR50 in FIGS. 14A and 14B must use a label different from that of the forwarding equivalence class FEC_M (N1→N2), which is disadvantageous in that the label availability decreases.

SUMMARY OF THE INVENTION

It is accordingly an object of the present invention to provide a packet relaying apparatus which prevents a collision of labels and which improves a label availability as much as possible.

[1] To achieve the above-mentioned object, a packet relaying apparatus for communicating with an adjoining packet relaying apparatus, according to the present invention comprising; a label distribution protocol processor for determining an available range and a directionality of a label by a negotiation with the adjoining packet relaying apparatus to assign the label to a forwarding equivalence class, a label management portion for managing the label assigned by the label distribution protocol processor, and a switch controller for performing a label switching based on the assignment, the label distribution protocol processor performing a label assignment so that the labels which the label management portion of the processor manages and which the label management portion of the adjoining packet relaying apparatus manages are assigned in mutually reversed orders within the label available range when the directionality is determined to be unidirectional.

Namely, when the directionality is determined to be "unidirectional", the label management portion manages not only the label assigned by itself but also the label assigned by an adjoining LSR. Namely, the label assignment is performed within the label available range in such an order opposite to the adjoining LSR that when the adjoining LSR assigns the labels from a smaller number, the LSR itself assigns the labels from a larger number.

This enables the label availability to be improved even when there is an unbalance occurrence of a label request between the adjoining LSR's.

[2] Also, a packet relaying apparatus according to the present invention, in the above-mentioned present invention [1], the label management portion may manage the labels assigned by itself and assigned by the adjoining packet relaying apparatus by using different management tables.

Namely, one management table may manage e.g. smaller number labels assigned by itself, and the other management table may manage larger number labels assigned by the adjoining station.

[3] Also, a packet relaying apparatus according to the present invention, in the above-mentioned present invention [1], the label distribution protocol processor may, use an incoming label and an outgoing label assigned to a unidirectional forwarding equivalence class respectively as an outgoing label and an incoming label when assigning the labels to another forwarding equivalence class opposite in direction to the former forwarding equivalence class.

Namely, when assigning "L-in" as the incoming label and "L-out" as the outgoing label to the unidirectional forwarding equivalence class, the label distribution protocol processor may assign "L-in" as the outgoing label and "L-out" as the incoming label to the forwarding equivalence class having the same path as the former forwarding equivalence class but opposite in direction.

[4] Also, a packet relaying apparatus according to the present invention, in the above-mentioned present invention [3], the label management portion may manage three of open, closed, and reserved statuses as label available statuses.

Namely, the label management portion may manage the reserved status in addition to the open and closed statuses as the label available statuses. By this management, when "L-in" is assigned as the incoming label, and "L-out" is assigned as the outgoing label to the unidirectional forwarding equivalence class. "L-in" and "L-out" may be reserved as the labels assigned to the forwarding equivalence class opposite in direction to the former forwarding equivalence class. Accordingly, when there is a label assignment request to the forwarding equivalence class opposite in direction, "L-in" may be assigned as the outgoing label and "L-out" may be assigned as the incoming label.

[5] Also, a packet relaying apparatus according to the present invention, in the above-mentioned present invention [1], when the label distribution protocol processor assigns an incoming label and an outgoing label to the unidirectional forwarding equivalence class, the labels may be simultaneously assigned to another forwarding equivalence class opposite in direction to the former forwarding equivalence class respectively as the outgoing label and the incoming label.

Namely, when the label distribution protocol processor assigns "L-in" as the incoming label and "L-out" as the outgoing label to the unidirectional forwarding equivalence class, "L-in" and "L-out" may be simultaneously assigned respectively as the outgoing label and the incoming label to the forwarding equivalence class opposite in direction.

[6] Also, a packet relaying apparatus according to the present invention, in the above-mentioned present invention [1], the label distribution protocol processor may regard a unidirectional forwarding equivalence class and another forwarding equivalence class opposite in direction to the former forwarding equivalence class as a single bidirectional forwarding equivalence class and assign the labels to the bidirectional forwarding equivalence class.

Namely, the label distribution protocol processor may treat the unidirectional forwarding equivalence class and the forwarding equivalence class opposite in direction to the former forwarding equivalence class as a single bidirectional forwarding equivalence class, and may assign "L-out" as the outgoing label when "L-in" is the incoming label and may assign "L-in" as the outgoing label when "L-out" is the incoming label, to the bidirectional forwarding equivalence class. This management enables the label availability to be much more improved.

[7] Also, a packet relaying apparatus according to the present invention, in the above-mentioned present invention [1], a combination of VPI and VCI may be used as the label and the switch controller may control an ATM switch.

[8] Also, a packet relaying apparatus according to the present invention, in the above-mentioned present invention [1], DLCI may be used as the label and the switch controller may control a frame relay switch.

BRIEF DESCRIPTION OF THE DRAWINGS

FIG. 4 is a sequence diagram illustrating an embodiment (1) of a packet relaying apparatus according to the present invention;

FIG. 5 is a sequence diagram illustrating an embodiment (2) of a packet relaying apparatus according to the present invention;

FIGS. 6A–6D are diagrams showing formats of an LDP message used in a packet relaying apparatus according to the present invention;

FIGS. 12A–12C are diagrams showing formats (1) of a prior art LDP message;

FIGS. 13A and 13B are diagrams showing formats (2) of a prior art LDP message.

Throughout the figures, like reference numerals indicate like or corresponding components.

DESCRIPTION OF THE EMBODIMENTS

Figure 1:
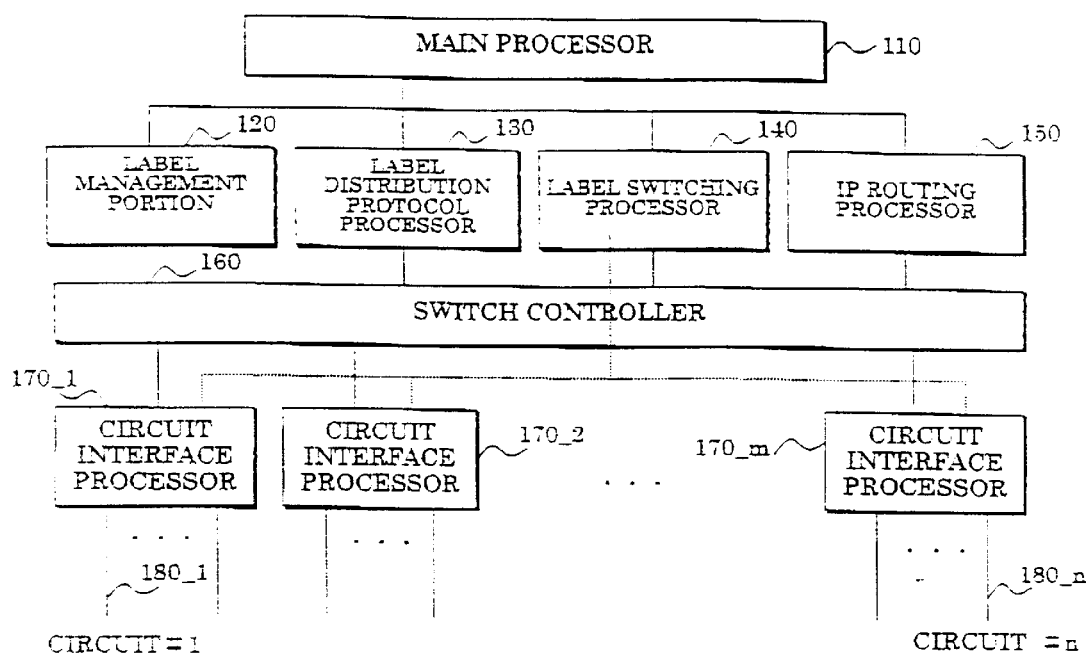
FIG. 1 is a block diagram showing an arrangement of a label switching router used as a packet relaying apparatus according to the present invention.

FIG. 1 is a block diagram showing an arrangement of a label switching router which can be used as a packet relaying apparatus according to the present invention. A main processor 110 provides portions described later with operation conditions and supervises label switching.

A label management portion 120 manages a label based on the operation condition provided by the main processor 110, and performs a label assignment/deassignment by a request from a label distribution protocol processor 130.

By the request from the main processor 110, the label distribution protocol processor 130 passes through a switch controller 160 substantially without stopping and sets up an LSP by assigning/distributing labels corresponding to a forwarding equivalence class between itself and an adjoining LSR by the mutual operation between the label distribution protocol processor 130 of the adjoining LSR and the label management portion 120 of its own via circuit interface processors 170_1-170_m, so that the LSP set up is notified to a label switching processor 140 and the label management portion 120.

The label switching processor 140 obtains essential information from the label management portion 120 by the notification from the label distribution protocol processor 130, and notifies the switch controller 160 of switching information.

The switch controller 160 realizes the label switching by the mutual operation with the circuit interface processors 170_1-170_m based on the switching information.

Also, the circuit interface processors 170_1-170_m transmit/receive a message, which is transmitted to/received from physical circuits 180_1-180_n, to/from the main processor 110 or the label distribution protocol processor 130 through the switch controller 160.

An IP routing protocol processor 150 prepares an IP routing table by the mutual operation with another router based on the IP routing protocol or by a configuration, and provides the main processor 110, the label switching processor 140, and the label distribution protocol processor 130 with information which triggers setting/resetting of the forwarding equivalence class.

Figure 2:
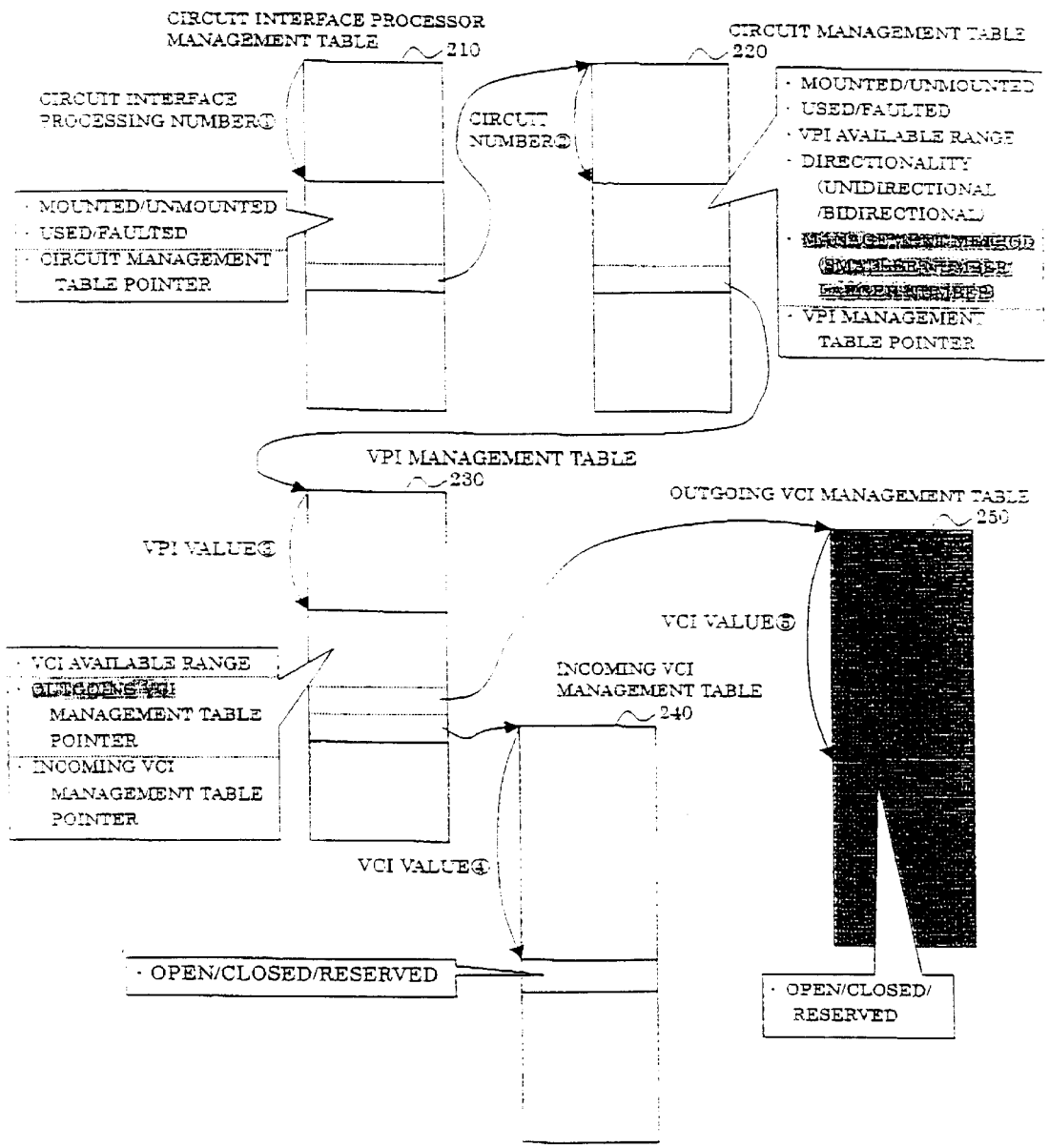
FIG. 2 is a diagram showing a mutual relationship of various kinds of management tables which a label management portion of a label switching router in FIG. 1 manages.

FIG. 2 shows an arrangement of a label management table 200 managed by the label management portion 120 in FIG. 1. The table 200 is composed of a circuit interface processor management table 210, a circuit management table 220, a VPI management table 230, an incoming VCI management table 240, and an outgoing VCI management table 250. The tables 210–250 are connected by pointers, The circuit interface processor management table 210 has information of a mounting status (mounted/unmounted), an available status (used/faulted), and a circuit management table pointer for each of "m" circuit interface processors 170_1-170_m specified by a circuit interface processor number ①.

The circuit management table 220 has information of the mounting status (mounted/unmounted), the available status (used/faulted), a VPI available range, a VPI management table pointer, a directionality (unidirectional/bidirectional), and a label management method (smaller number/larger number) for each of "n" physical circuits 180_1-180_n specified by a circuit number ②.

The VPI management table 230 has information of a VCI available range, an outgoing VCI management table pointer, and an incoming VCI management table pointer for each VPI specified by a VPI value ③.

The incoming VCI management table 240 and the outgoing VCI management table 250 have information of the available status (open/closed/reserved) for each VCI specified by VCI values ④ and ⑤.

Figure 3:
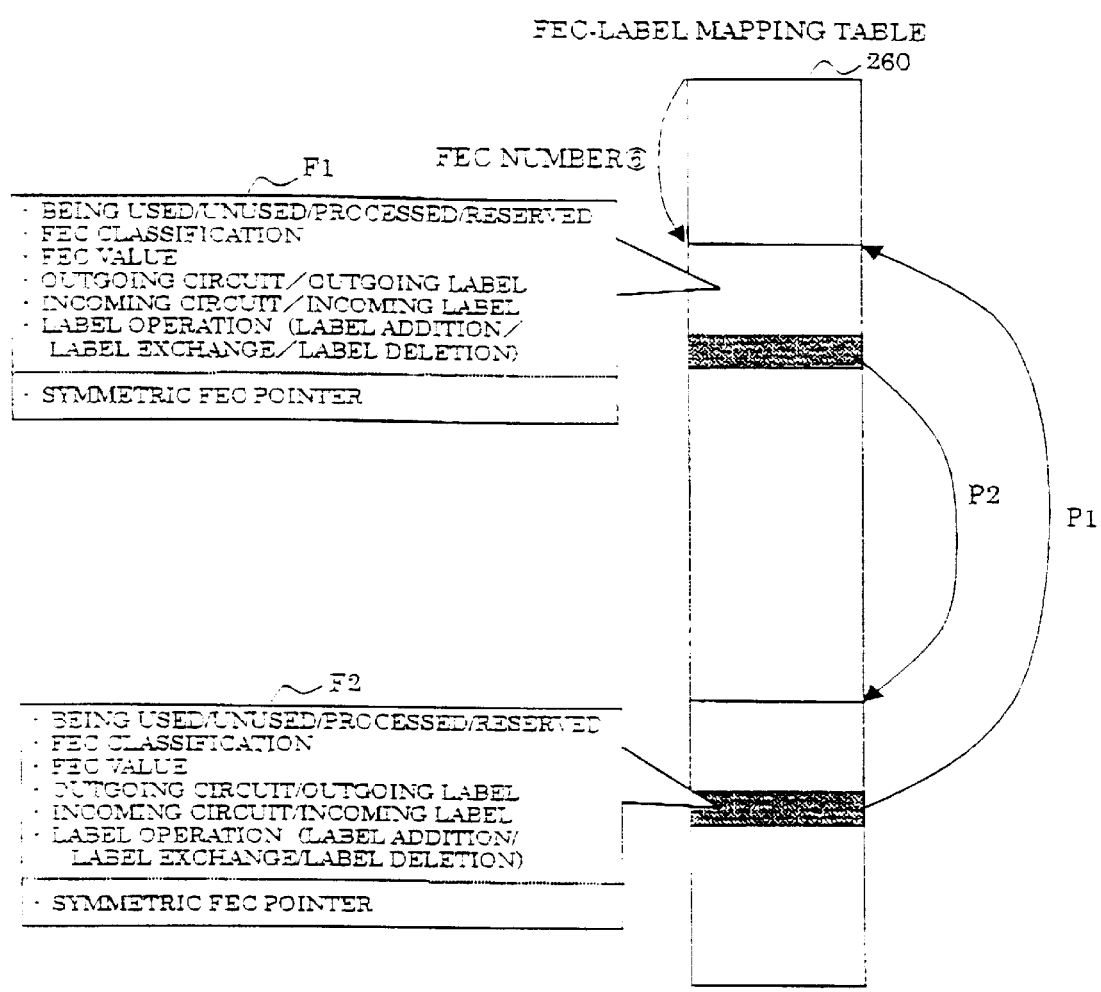
FIG. 3 is a diagram showing an FEC-label binding table which a label switching processor of a label switching router in FIG. 2 manages.

In addition, FIG. 3 shows an FEC-label mapping table 260 which the label switching processor 140 in FIG. 1 manages.

The table 260 has information of the available status (used/unused/processed/reserved), an FEC classification, an FEC value, an outgoing circuit/outgoing label, an incoming circuit/incoming label, a label operation (label addition, label exchange, label deletion), and a symmetric FEC pointer for each forwarding equivalence class specified by an FEC number ⑥.

It is to be noted that the symmetric FEC pointer designates a symmetric forwarding equivalence class which has the same path as a certain forwarding equivalence class but is opposite in direction, and forwarding equivalence classes F1 and F2 which are mutually symmetric are related by pointers P1 and P2.

It is to be noted that the table 260 is prepared at the label switching processor 140 and controlled at e.g. the label management portion 120 separately from the management table 200 in FIG. 2.

Hereinafter, embodiments (1)–(3) of a packet relaying apparatus according to the present invention will be described together with an operation of an ATM-LSR 100 in FIG. 1, setting values of the tables 210–250 in FIG. 2, and setting values of the FEC-label mapping table in FIG. 3.

Embodiment (1)

FIG. 4

Figure 10:
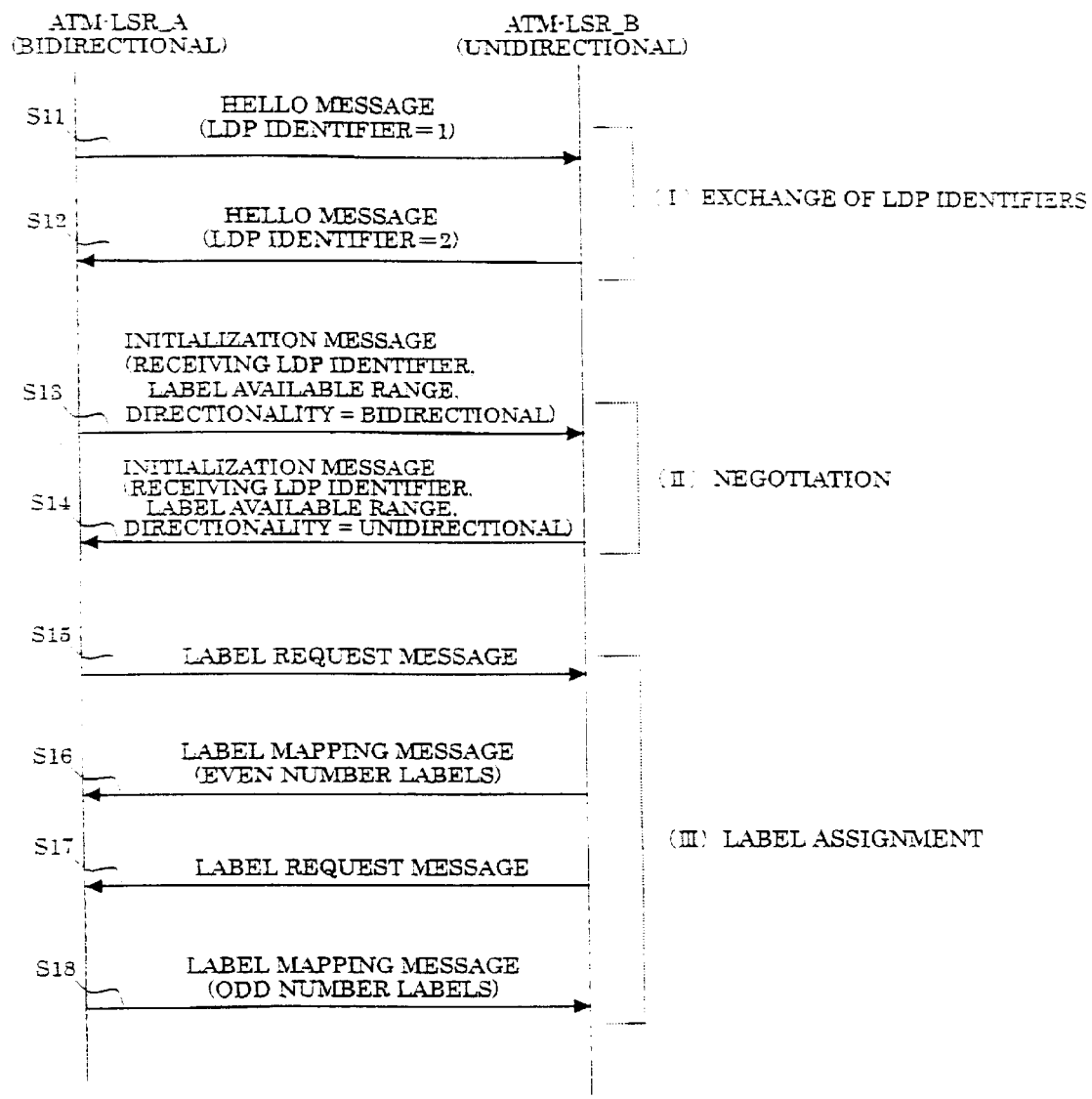
FIG. 10 is a sequence diagram illustrating an operation example of a prior art packet relaying apparatus.
Figure 11:
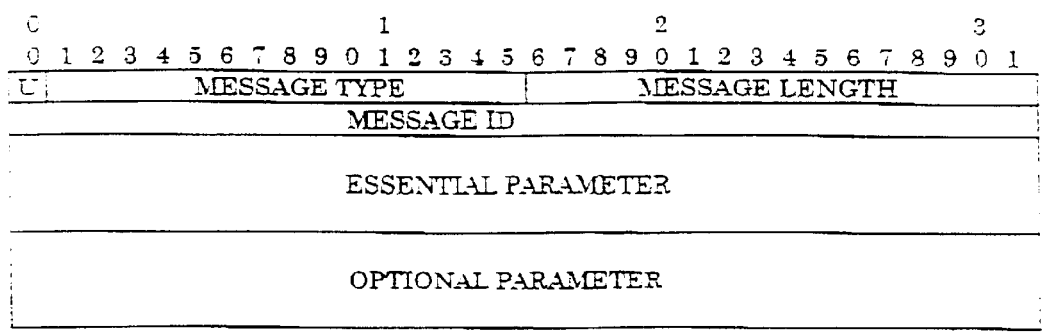
FIG. 11 is a diagram showing a format of a general LDP message.

An operation example of this label assignment is composed of in the same way as the prior art operation example (see FIG. 10), steps of (I) Exchange of LDP identifiers, (II) Negotiation, and (III) Label assignment. It is to be noted that an ATM-LSR_A is supposed to be "bidirectional" and an ATM-LSR_B is supposed to be "unidirectional" in FIG. 4.

Also, before the steps of (I) Exchange of LDP identifiers an initialization of the management tables 210–250 and the FEC-label mapping table 260 is supposed to have been completed at the ATM-LSR_A and the ATM-LSR_B.

Specifically, by the notification from the circuit interface processor 170_m shown in FIG. 1, the mounting status (mounted/unmounted) and the fault status (used/faulted) for each circuit interface processor number ① are set in the circuit interface processor management table 210 and if necessary, the circuit management table pointer is set.

Then, by the notification from the corresponding circuit interface processor 170_m, the mounting status (mounted/ unmounted) and the fault status (used/faulted) for each circuit number ② are set in the circuit management table 220 corresponding to the circuit management table pointer set and if necessary, the VPI (label 1) management table pointer is set.

Also, the available statuses (being used/unused/processed/reserved) of all of the FEC numbers ⑥ in the FEC-label mapping table 260 are made the unused status by the label switching processor 140.

In the steps of (I) Exchange of LDP identifiers, the ATM-LSR-_A sends a hello message including an "LDP identifier (=1)" for identifying itself to the adjoining ATM-LSR_B (at step S11). The ATM-LSR_B which has received the hello message returns another hello message including an "LDP identifier (=2)" for identifying itself to the ATM-LSR_A (at step S12).

Also, in the steps of (II) Negotiation, the ATM-LSR_A sends an initialization message including a "receiving LDP identifier (=2)", a label available range, and a directionality (=bidirectional) to the adjoining ATM-LSR>_B (at step S13), which similarly returns another initialization message including a "receiving LDP identifier (=1)", a label available range, and a directionality (-unidirectional) to the ATM-LSR_A (at step S14).

The logical multiplication of the label available range can be obtained at both of the LSR's to determine the label available range. In addition, since the ATM-LSR_B is "unidirectional", the directionality of the ATM-LSR_A becomes "unidirectional".

The label distribution protocol processor 130 of both LSR's notifies the label management portion 120 of the negotiation result. The label management portion 120 which has received the notification sets the management table 200 shown in FIG. 2 as follows:

In the circuit management table 220. "unidirectional" as the directionality, the VPI available range and the VPI management table pointer, as well as the management method of the corresponding circuit number ② are set. It is to be noted that a "larger number" is set in the circuit management table 220 of e.g. the ATM-LSR_A, and a "smaller number" is set in that of the ATM-LSR_B by the management method.

In the VPI management table 230, the VCI available range, the incoming VCI management table pointer, and the outgoing VCI management table pointer for each of the VCI values ③ in the above-mentioned VPI available range are set.

In the incoming VCI management table 240 and the outgoing VCI management table 250, the available statuses of all the VCI values ④ and ⑤ are set to "open" within the above-mentioned VCI available range corresponding to all of the pointers set in the VPI management table.

Then, the main processor 110 determines a label assignment condition by the configuration. If the determination for the condition is required, it is performed by the mutual operation with the IP routing processor 150. The main processor 110 which has confirmed the fulfillment of the condition requests the label distribution protocol processor 130 to set up the LSP by assigning the label to the concerned forwarding equivalence class.

The label distribution protocol processor 130 which has received the label assignment/LSP setting request from the main processor 110 performs the label assignment/LSP setting by the mutual operation with the adjoining LSR corresponding to the concerned forwarding equivalence class.

Namely, when the steps of (III) Label assignment in FIG. 4 are performed and the ATM-LSR_A uses a label, the label request message is sent to the ATM-LSR_B (at step S15), and receives the label assignment from the smaller number by the label mapping message sent from the ATM-LSR_B (at step S16).

To the contrary, when the ATM-LSR_B uses a label, it sends the label request message to the ATM-LSR_A (at step S17), and receives the label assignment from the larger number by the label mapping message sent from the ATM-LSR_A (at step S18).

The operation of the label assignment at steps S15 and S16 will now be more specifically described.

The label distribution protocol processor 130 of the ATM-LSR_A notifies the label management portion 120 of the label assigned by the ATM-LSR_B.

The label management portion 120 which has received the above-mentioned notification makes the concerned VCI portion of the incoming VCI management table 240, corresponding to the notified circuit interface processor number/circuit number/VPI, "closed", and makes the concerned VCI portion of the outgoing VCI management table 250 "closed".

In addition, the label distribution protocol processor 130 of the ATM-LSR_B which has received the label request message from the ATM-LSR_A determines the assignment condition of the label (by the mutual operation with the main processor 110 and the IP routing processor 150). When the condition is fulfilled, the label assignment corresponding to the forwarding equivalence class is requested from the label management portion 120.

The label management portion 120 which has received the above-mentioned request retrieves open labels based on the label available range/directionality/management method by which the labels are used from the smaller number/the larger number, for the assignment.

Specifically, the retrieval range and the retrieval method of the VPI is determined by referring to the circuit management table 220 with respect to the notified circuit interface processor number/directionality of the circuit number corresponding portion, the management method, and the VPI available range.

Then, in the corresponding VPI management table 230, the open VCI in the incoming VCI management table 240 is retrieved and rewritten to the closed status by the VCI available range and the retrieval range and the retrieval method of the VPI determined above.

Furthermore, the concerned VCI portion of the outgoing VCI management table 250 corresponding to the VCI retrieved above is made "closed".

Then, the label management portion 120 notifies the label distribution protocol processor 130 of the above label assignment information.

By this operation, the label distribution protocol processor 130 returns the label mapping message to the ATM-LSR_A to complete the assignment of the smaller number labels.

In addition, at steps S17 and S18, the assignment of the larger number labels is performed in the same way as steps S15 and S16.

The label distribution protocol processor 130 of each LSR which has thus completed the label assignment notifies the label switching processor 140 that the packet of the concerned forwarding equivalence class is forwarded by the concerned label in order to perform the label switching process (not shown) following the sequence of FIG. 4.

The label switching processor 140 which has received the above notification prepares the FEC-label mapping table 260 shown in FIG. 3.

Specifically, either of the following processes is performed by the instructions of the label distribution protocol processor 130:

(a) The table 260 is retrieved to catch an open FEC number ⑥, whereby the availability status is made "used".
(b) The table 260 is retrieved with the notified FEC as a key to specify the FEC number ⑥.

Also, what is notified from the label distribution protocol processor 130 is set in the FEC classification/FEC value/outgoing circuit/outgoing label/incoming circuit/incoming label/label operation/symmetric FEC pointer of the corresponding FEC number ⑥.

Furthermore, the concerned information is notified to the switch controller 160 and e.g. the circuit interface processor 170_m of the processors 170_1-170_m.

The switch controller 160 which has received the above notification performs the switching process of the incoming label and the outgoing label by the concerned information.

When the circuit interface processor 170_m which has received the above notification receives the packet without label from e.g. the circuit 180_n, the incoming label is assigned to the packet based on the concerned information and is cellulated, whereas for ATM circuits the packet is not cellulated, and the labeled cell is transferred to the switch controller 160. In addition, when the labeled packet is received from the circuit 180_n, the packet is cellulated, whereas for ATM circuits the packet is not cellulated, and the labeled cell is transferred to the switch controller 160. Furthermore, when the labeled packet (cell) is received from the switch controller 160, the label is deleted or the labeled packet is decellulated, whereas for ATM circuits the packet is not cellulated, based on the concerned information to be transmitted to the circuit 180_n.

Embodiment (2)

FIG. 5

This embodiment enables the label to be used, which can not be used as a label assigned to the symmetric forwarding equivalence class because both LSR's manage the label with the status being made "closed" when the label assignment is performed to a certain forwarding equivalence class.

Namely, by making the label have the reserved status as the one for the symmetric forwarding equivalence class when the label is assigned to a certain forwarding equivalence class, the label becomes available when the label is assigned to the symmetric forwarding equivalence class.

Specifically, when the label assignment is received from the adjoining LSR, the concerned label of the outgoing VCI management table is made "closed", while if necessary the concerned label of the incoming VCI management table 240 is made "reserved".

It is to be noted that since the exchange and negotiation of the LDP identifiers in the embodiment (2) are the same as the steps of (I) and (II) in FIG. 4, the illustration is omitted.

In FIG. 5, steps (IV) show an example in which the same label is used for the symmetric forwarding equivalence class.

Firstly, when the ATM-LSR_A uses a label, it sends the label request message to the ATM-LSR_B (at step S21). At this time, the information that the symmetric forwarding equivalence class is requested for use is preliminarily included.

In the ATM-LSR_B, an open VCI of the incoming VCI management table 240 retrieved from the smaller number is made "closed" and the concerned VCI portion of the outgoing VCI management table 250 is made "reserved". Furthermore, F1 (see FIG. 3) indicating the concerned forwarding equivalence class in the FEC-label mapping table 260 is made "used" and the symmetric forwarding equivalence class (F2) is made "reserved".

In addition, the ATM-LSR_B assigns the smaller number label by the label mapping message (at step S22). This label mapping message includes the label assigned to the ATM-LSR_A as well as the information that the symmetric forwarding equivalence class is available.

At this time, the concerned VCI portion of the concerned outgoing VCI management table 250 is made "closed" and the concerned VCI portion of the incoming VCI management table 240 is made "reserved", at the ATM-LSR_A.

When the ATM-LSR_B uses a label the label request message is sent to the ATM-LSR_A (at step S23). At this time, the information that the symmetric forwarding equivalence, class is requested can be included.

Since having a request for the symmetric forwarding equivalence class from the ATM-LSR_B, the ATM-LSR_A changes the concerned VCI previously reserved at the incoming VCI management table 240 to "closed", and notifies the ATM-LSR_B of the label assignment by the label mapping message (at step S24).

Figure 14A:
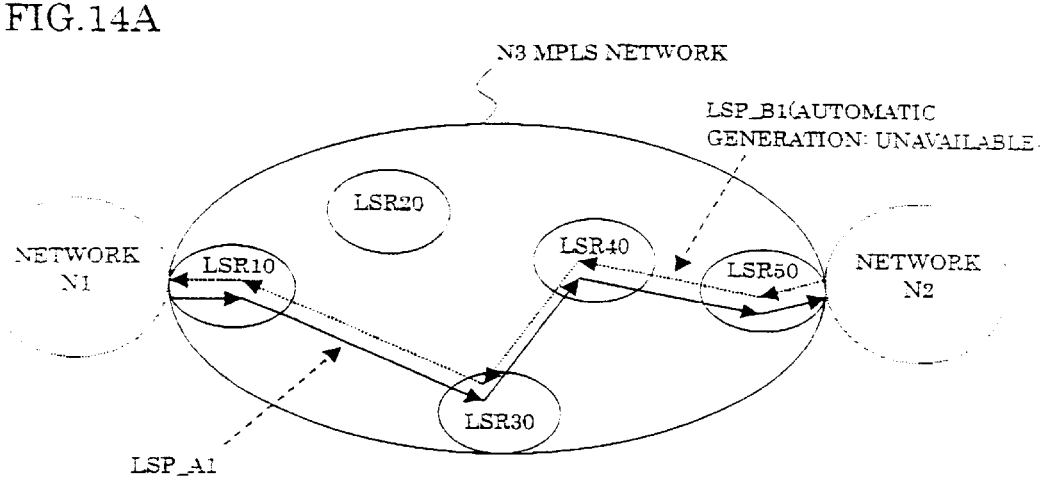
FIGS. 14A and 14B are diagrams showing MPLS networks each composed of a plurality of LSR's.
Figure 14B:
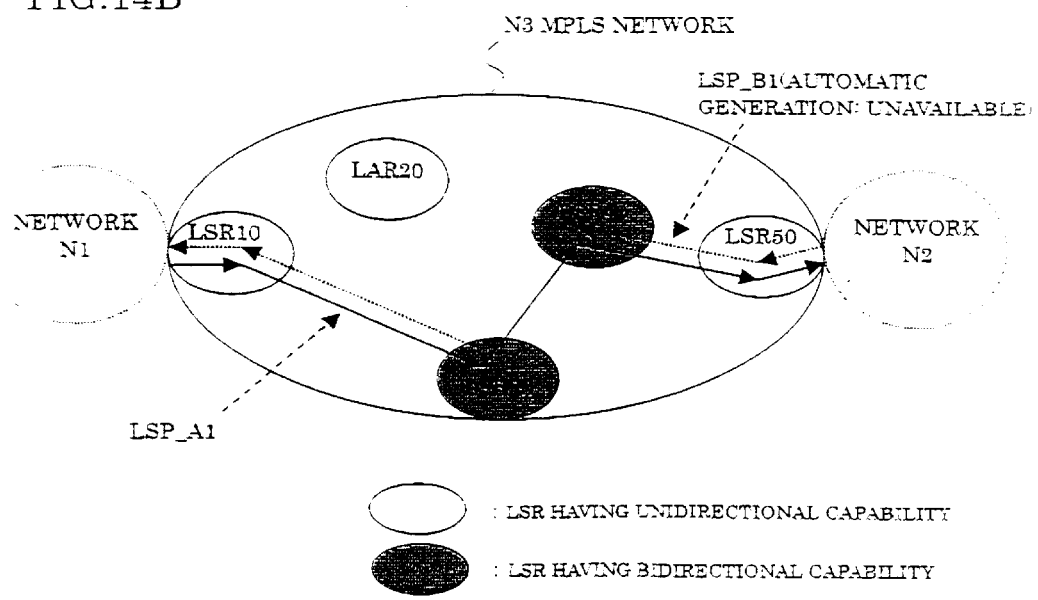

Accordingly if an MPLS network N3 in FIGS. 14A and 14B is composed of such an ATM-LSR, it becomes possible to use the LSP_B1 (LSR50→LSR40→LSR30→LSR10) in; FIG. 14A and the portions (LSR30→LSR10 and LSR50→LSR40) of the LSP-B1 in FIG. 14B which could not be used in the prior art.

Steps (V) in FIG. 5 show an example in which another label is used when the symmetric forwarding equivalence class can not be used.

In this case, firstly, when the ATM-LSR_A sends the label request message to the ATM-LSR_B (at step S25), the information that the symmetric forwarding equivalence class is requested for use is included. Receiving the message, the ATM-LSR_B performs the label assignment from the smaller number by the label mapping message (at step S26). However, since the symmetric forwarding equivalence class can not be used at this time, the label assigned to the ATM-LSR_A together with and the information that the symmetric forwarding equivalence class is unavailable are included in the label mapping message.

When the ATM-LSR_B uses a label, it sends the label request message to the ATM-LSR_A (at step S27). Since the ATM-LSR_B does not request to use the symmetric forwarding equivalence class at this time. the ATM-LSR_A does not use the symmetric forwarding equivalence class, and assigns another label (at step S28).

The label switching process in the embodiment (2) is the same as the embodiment (1). However, the symmetric FEC pointer is additionally defined in the FEC-label mapping table 260, and the mutual link of the symmetric forwarding equivalence class can be obtained when necessary.

In order to realize the above mentioned description, the embodiment (2) provides the following addition/change to the message:

(a) The label mapping message is made a vendor private massage as shown in FIG. 6A;
(b) The label request message is made a vendor private message as shown in FIG. 6B;
(c) A symmetric FEC assignment operation TLV in FIG. 6C is defined as a vendor private TLV;
(d) For an FEC element in FIG. 6D, a prefix pair (unidirection) and a host address pair (unidirection) are defined.

It is to be noted that the prefix pair (unidirection) is a pair of source address prefix and destination address prefix, and the flow from the designated source address prefix towards the destination address prefix assumes the corresponding forwarding equivalence class. Also, the source address prefix mutually exchanged with the destination address prefix assumes the symmetric forwarding equivalence class.

The host address pair (unidirection) is a pair of source host address and destination host address, and the flow from the designated source host address towards the destination host address assumes the corresponding forwarding equivalence class. Also, the source host address mutually exchanged with the destination host address assumes the symmetric forwarding equivalence class.

Embodiment (3)

FIG. 7

Since the exchange of the LDP identifiers and the negotiation is the same as the steps (I) and (II) of FIG. 4 in this embodiment (3), the illustration is omitted.

Figure 7:
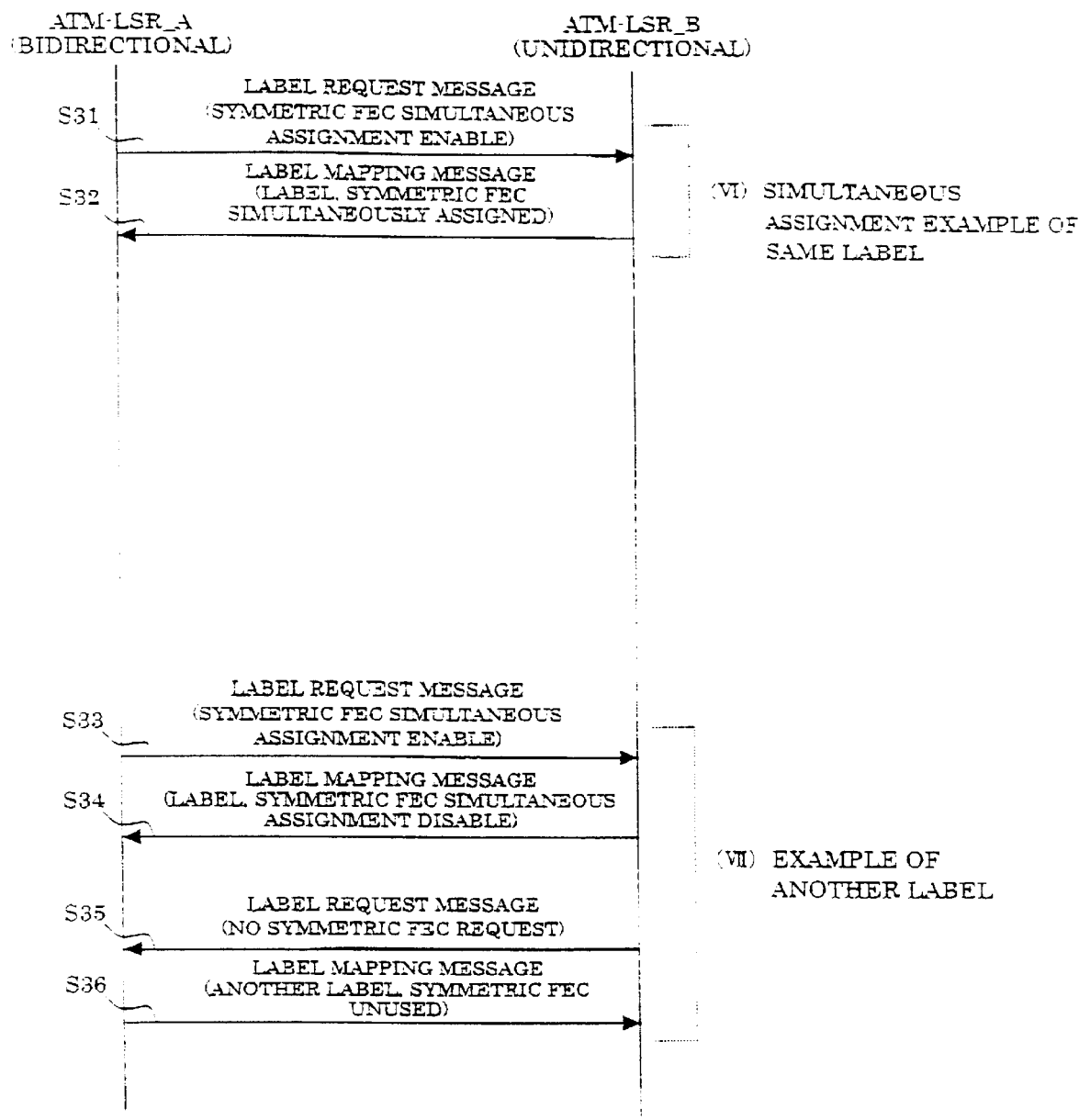
FIG. 7 is a sequence diagram illustrating an embodiment (3) of a packet relaying apparatus according to the present invention.
Figure 8:
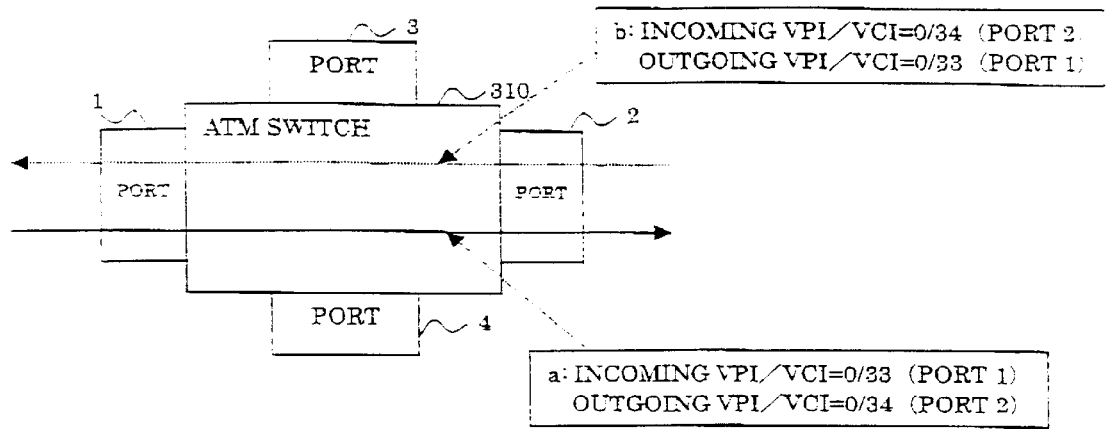
FIG. 8 is a diagram illustrating a connection setting of a general ATM switch having a unidirectional capability.
Figure 9:
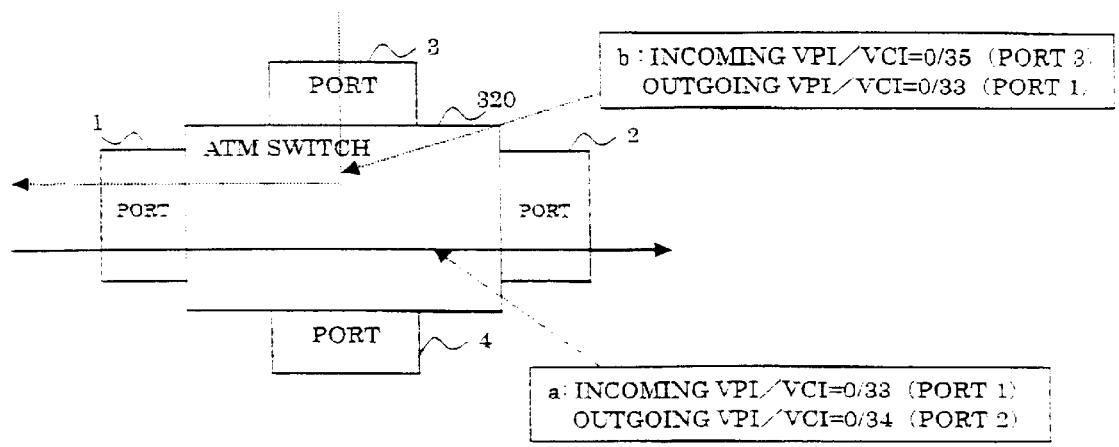
FIG. 9 is a diagram illustrating a connection setting of a general ATM switch having a bidirectional capability.

In FIG. 7, steps (VI) show an example in which the same label is simultaneously assigned to the symmetric forwarding equivalence class.

Firstly, when the ATM-LSR_A uses a label, it sends the label request message to the ATM-LSR_B (at step S21). At this time, the information that the label can be simultaneously assigned to the symmetric forwarding equivalence class is included. Receiving the information, the ATM-LSR_B performs the label assignment from the smaller number by the label mapping message (at step S22). At this time, the label assigned to the ATM-LSR_A as well as the information that the label is simultaneously assigned to the symmetric forwarding equivalence class are included in the label mapping message.

The label distribution protocol processor 130 of the ATM-LSR_A makes the label assignment request to the ATM-LSR_B by the label request message. At this time, it is determined whether or not the concerned forwarding equivalence class in each unidirection can be one of the symmetric forwarding equivalence classes. If it is the case, both of the symmetric forwarding equivalence classes are simultaneously added, so that the simultaneous assignment request of the symmetric forwarding equivalence class is added.

In response, the label mapping message is received from the ATM-LSR_B, thereby completing the label assignment/LSP setting. At this time, the contents of the notification from the ATM-LSR_B (simultaneous mapping of assignment label and the symmetric forwarding equivalence class) are notified to the label management portion 120.

The label management portion 120 which has received the above notification makes the concerned VCI portion of the outgoing VCI management table, corresponding to the notified circuit interface processor number/circuit number/VPI. "closed", and if necessary the concerned VCI portion of the incoming VCI management table is made "closed" by the designation from the label distribution protocol processor 130.

Also, the label corresponding to the symmetric forwarding equivalence class is simultaneously set.

To the contrary, the label distribution protocol processor 130 of the ATM-LSR_B which has received the label request message from the adjoining ATM-LSR_A determines the label assignment condition (by the mutual operation of the main processor with the IP routing processor). When the condition is fulfilled the processor 130 requests the label assignment corresponding to the concerned forwarding equivalence class to the label management portion 120. At this time, if necessary, the label assignment to the symmetric forwarding equivalence class is also notified.

The label management portion 120 which has received the above request retrieves/assigns the open label based on the label available range/directionality/management method by which the labels are used from the smaller/larger number. If necessary, the management portion 120 assigns the label corresponding to the symmetric forwarding equivalence class to be notified to the label distribution protocol processor 130.

Specifically, the retrieval range and the retrieval method of the VPI are determined by referring to the notified circuit interface processor number/directionality of the circuit number corresponding portion, management method, and the VPI available range.

Then, the open VCI of the incoming VCI management table in the corresponding VPI management table is retrieved and rewritten to the closed status by the VCI available range as well as the retrieval range and the retrieval method of the VPI determined above.

Furthermore, by the instructions from the label distribution protocol processor, the concerned VCI portion of the outgoing VCI management table corresponding to the VCI retrieved above is made "closed".

By this operation, the label distribution protocol processor of the ATM-LSR_B returns the label mapping message to the ATM-LSR_A to complete the label assignment. At this time, the simultaneous assignment of the symmetric forwarding equivalence class is designated if necessary.

Also, in FIGS. 6A–6D, steps (VII) show an example in which the symmetric forwarding equivalence class can not be used and another label is used.

In this case, firstly, when the ATM-LSR_A uses a label and sends the label request message to the ATM-LSR_B (at step S33), the information that the symmetric forwarding equivalence class can be simultaneously assigned is included. Receiving the information, the ATM-LSR_B performs the label assignment from the smaller number by the label mapping message (at step S34). At this time, the label assigned to the ATM-LSR_A together with the information that the symmetric forwarding equivalence class can not be simultaneously assigned is included in the label mapping message.

When the ATM-LSR_B uses a label, it sends the label request message to the ATM-LSR_A (at step S35). At this time, since the ATM-LSR_B does not make the request for using the symmetric forwarding equivalence class, the ATM-LSR_A does not use the symmetric forwarding equivalence class and assigns another label (at step S36).

The following processes are the same as the embodiment (2).

The unidirectional forwarding equivalence class in the above embodiments (2) and (3) may be extended to unite the forwarding equivalence classes in mutually symmetric unidirections into a single bidirectional FEC element which may define and use a prefix pair (bidirection) or a host address pair (bidirection).

It is to be noted that the prefix pair (bidirection) is a pair of two address prefixes (address prefix 1/address prefix 2), or a pair of flow from the designated address prefix 1 towards the address prefix 2 and flow from the designated address prefix 2 towards the address prefix 1.

In addition, the host address pair (both directions) is a pair of two host addresses (host address pair 1/host address pair 2), or a pair of flow from the designated host address 1 towards the host address pair 2 and flow from the designated host address pair 2 towards the host address pair 1.

As described above, a packet relaying apparatus according to the present invention is arranged such that a label distribution protocol processor performs a label assignment so that labels which a label management portion of the processor manages and which the label management portion of an adjoining packet relaying apparatus manages are assigned in mutually reversed orders within a label available range when a directionality is determined to be unidirectional. Therefore, when there is an unbalanced occurrence of a label request between the adjoining LSR's, a label availability can be improved.

In addition, a packet relaying apparatus according to the present invention is arranged such that an incoming label and an outgoing label assigned to a unidirectional forwarding equivalence class can be used as the outgoing label and the incoming label assigned to another forwarding equivalence class opposite in direction to the former forwarding equivalence class. Therefore, the label availability can be further improved.

What we claim is:

1. A packet relaying apparatus for communicating with an adjoining packet relaying apparatus, comprising;
    a label distribution protocol processor for determining an available range and a directionality of a label by a negotiation with the adjoining packet relaying apparatus to assign the label to a forwarding equivalence class,
    a label management portion for managing the label assigned by the label distribution protocol processor, and
    a switch controller for performing a label switching based on the assignment, the label distribution protocol processor performing a label assignment within the label available range so that the label managed by the label management portion of the processor is assigned in a reverse order from an assignment order of the label managed by the label management portion of the adjoining packet relaying apparatus when the directionality is determined to be unidirectional.

2. The packet relaying apparatus as claimed in claim 1 wherein the label management portion manages labels assigned by itself and by the adjoining packet relaying apparatus by using different management tables.

3. The packet relaying apparatus as claimed in claim 1 wherein the label distribution protocol processor uses an incoming label and an outgoing label assigned to a unidirectional forwarding equivalence class respectively as an outgoing label and an incoming label when assigning the labels to another forwarding equivalence class opposite in direction to the former forwarding equivalence class.

4. The packet relaying apparatus as claimed in claim 3 wherein the label management portion manages three of open, closed, and reserved statuses as label available statuses.

5. The packet relaying apparatus as claimed in claim 1 wherein when the label distribution protocol processor assigns an incoming label and an outgoing label to the unidirectional forwarding equivalence class, the labels are simultaneously assigned to another forwarding equivalence class opposite in direction to the former forwarding equivalence class respectively as the outgoing label and the incoming label.

6. The packet relaying apparatus as claimed in claim 1 wherein the label distribution protocol processor regards a unidirectional forwarding equivalence class and another forwarding equivalence class opposite in direction to the former forwarding equivalence class as a single bidirectional forwarding equivalence class and assigns the labels to the bidirectional forwarding equivalence class.

7. The packet relaying apparatus as claimed in claim 1 wherein the switch controller uses a combination of VPI and VCI as the label to perform an ATM switching.

8. The packet relaying apparatus as claimed in claim 1 wherein the switch controller uses DLCI as the label to perform a frame relay switching.

* * * * *